Nov. 24, 1925.
B. L. VAN ORMAN
1,562,997
WIRE FEEDING MEANS
Original Filed Feb. 3, 1923   6 Sheets-Sheet 1
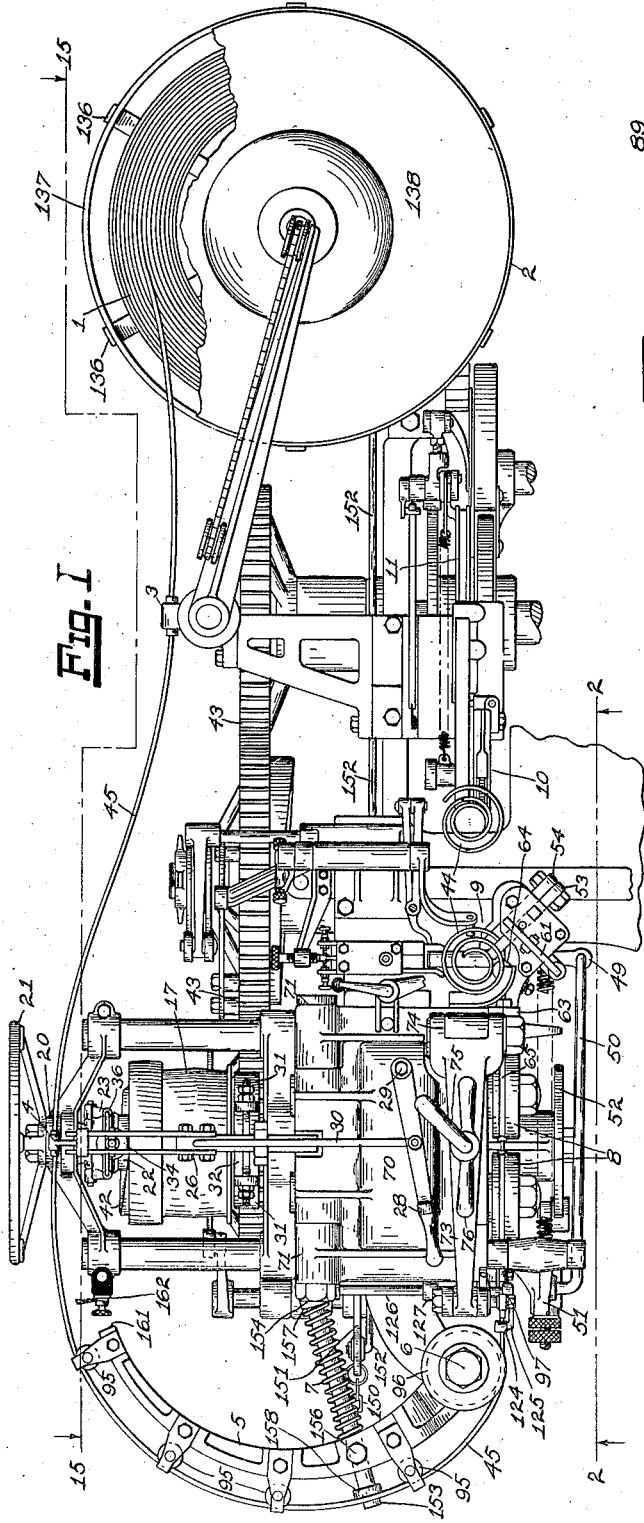
Fig. I
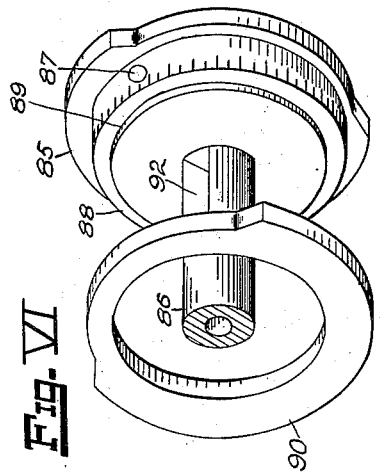
Fig. VI
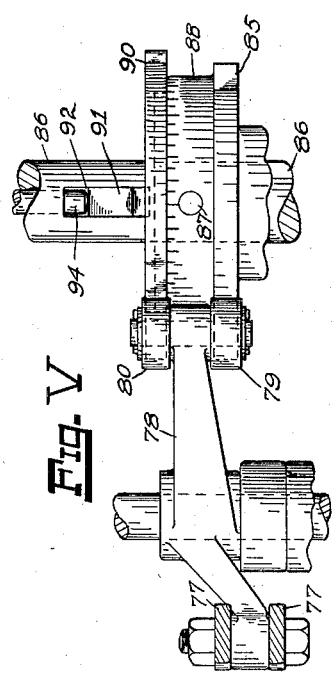
Fig. V
INVENTOR
*Bert L. VanOrman*
BY
*Chappell & Earl*
ATTORNEYS

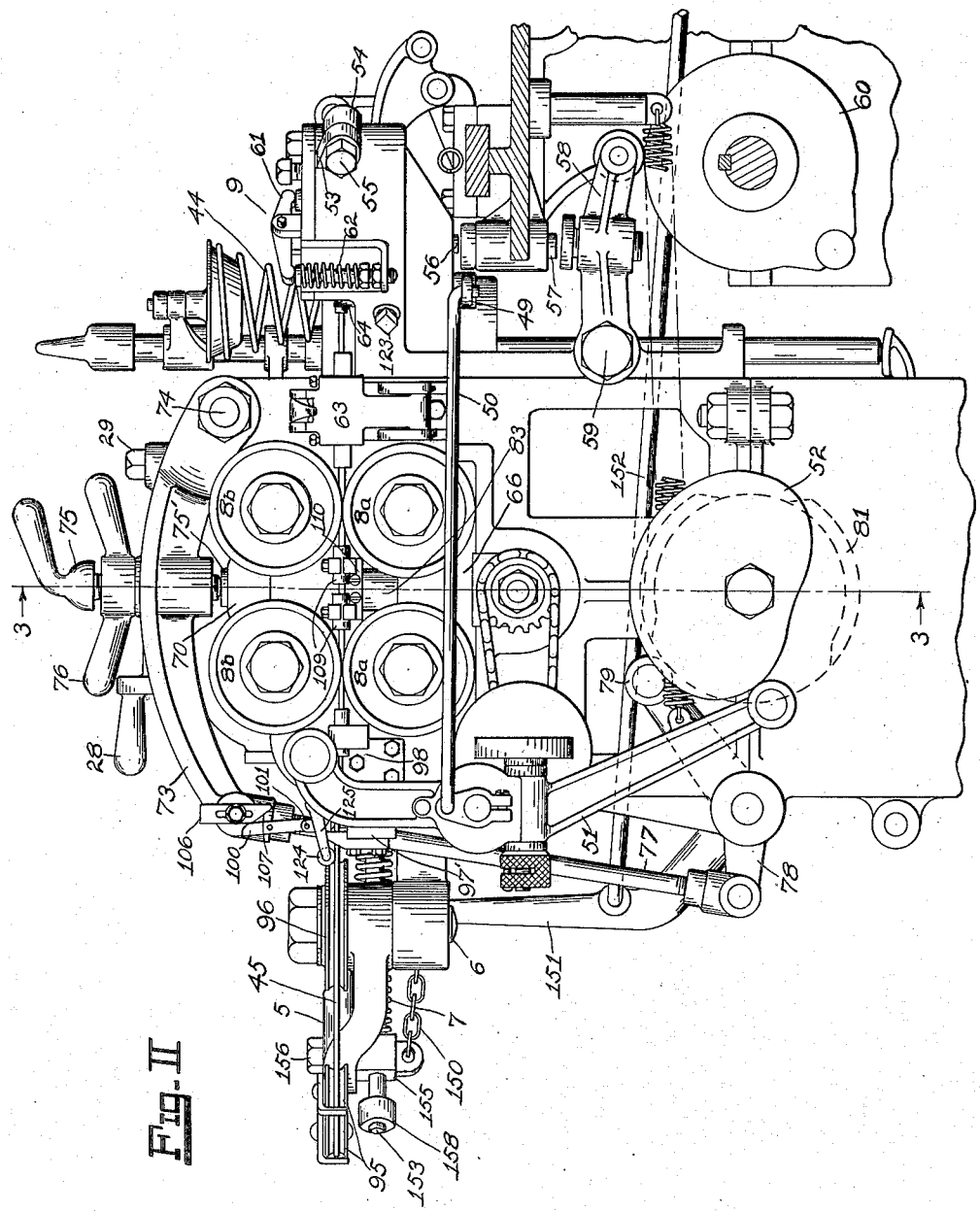

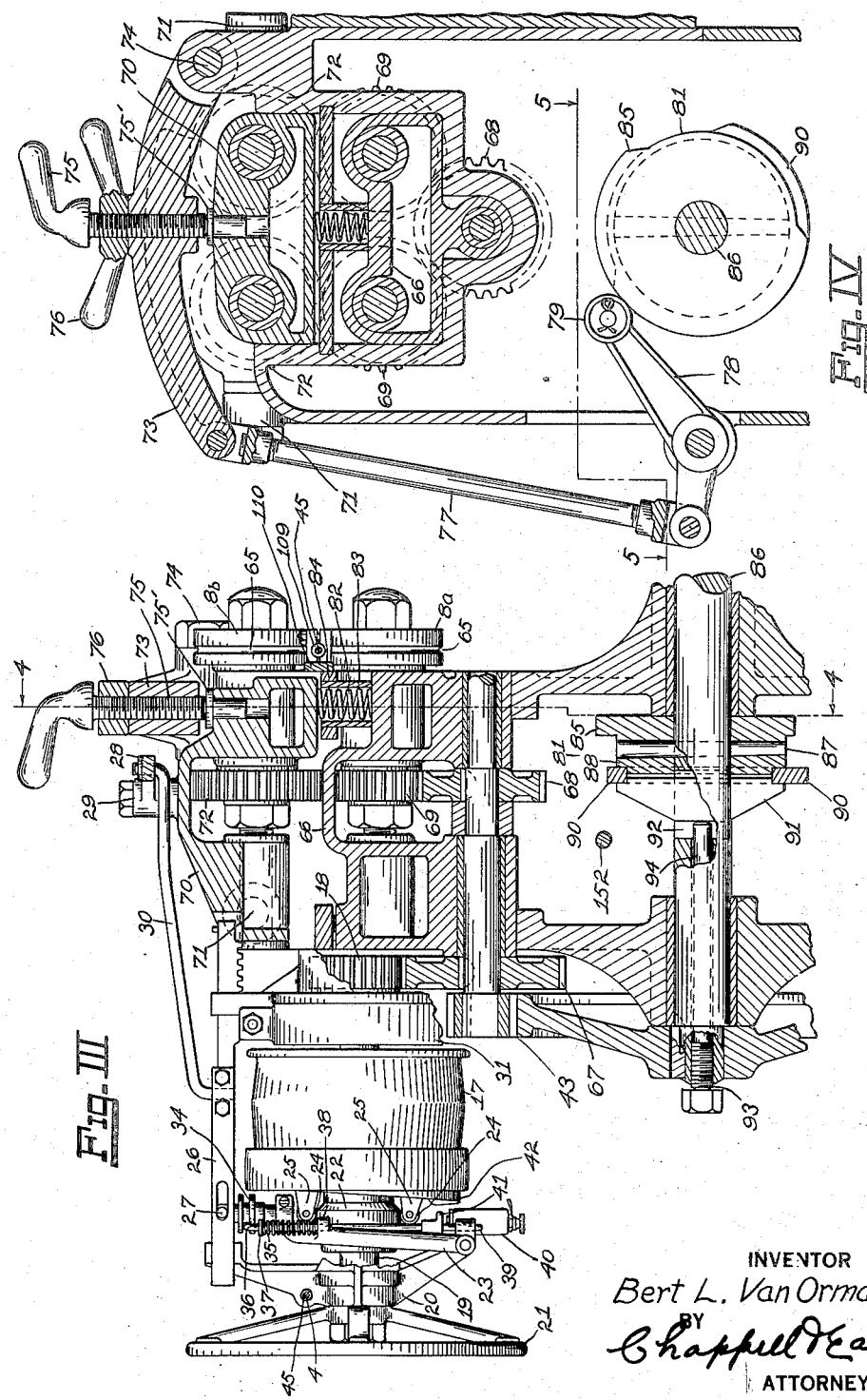

Nov. 24, 1925.
B. L. VAN ORMAN
1,562,997
WIRE FEEDING MEANS
Original Filed Feb. 3, 1923  6 Sheets-Sheet 4
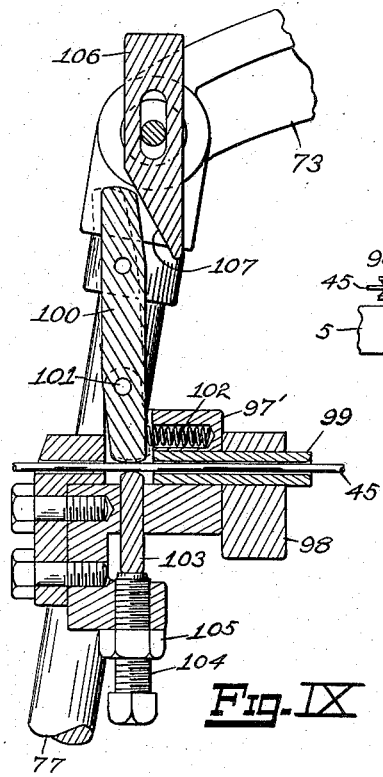
Fig. IX
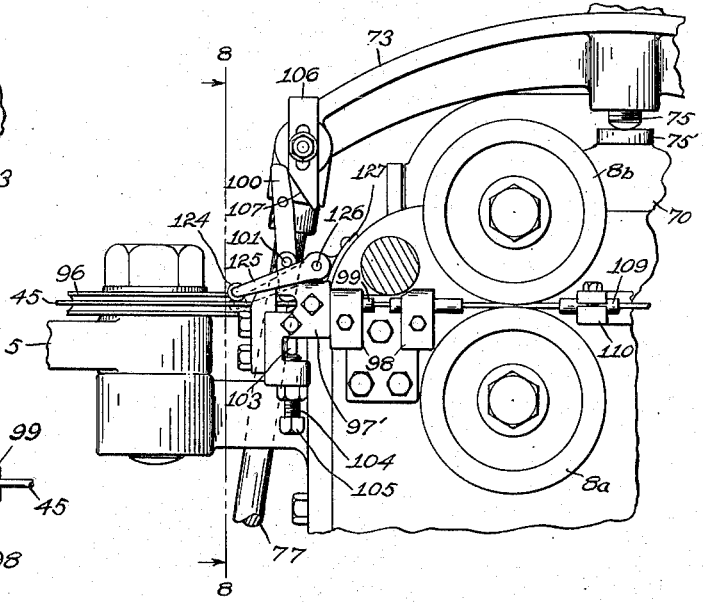
Fig. VII
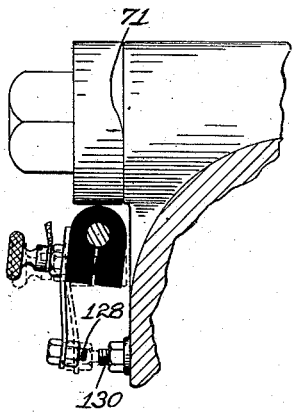
Fig. X
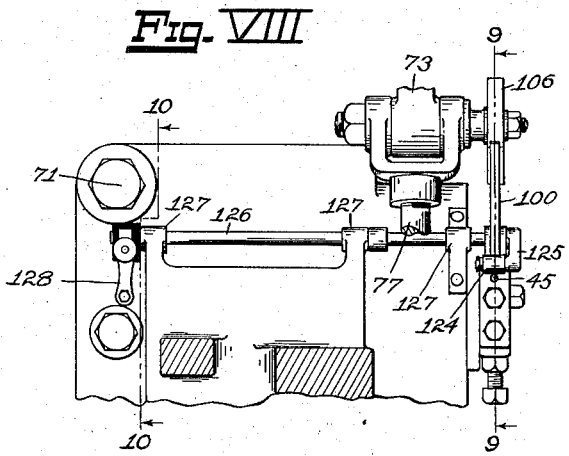
Fig. VIII
INVENTOR
Bert L. Van Orman
BY
Chappell & Earl
ATTORNEYS Nov. 24, 1925.
B. L. VAN ORMAN
WIRE FEEDING MEANS
Original Filed Feb. 3, 1923   6 Sheets-Sheet 5
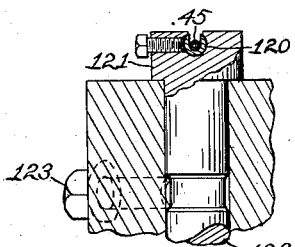
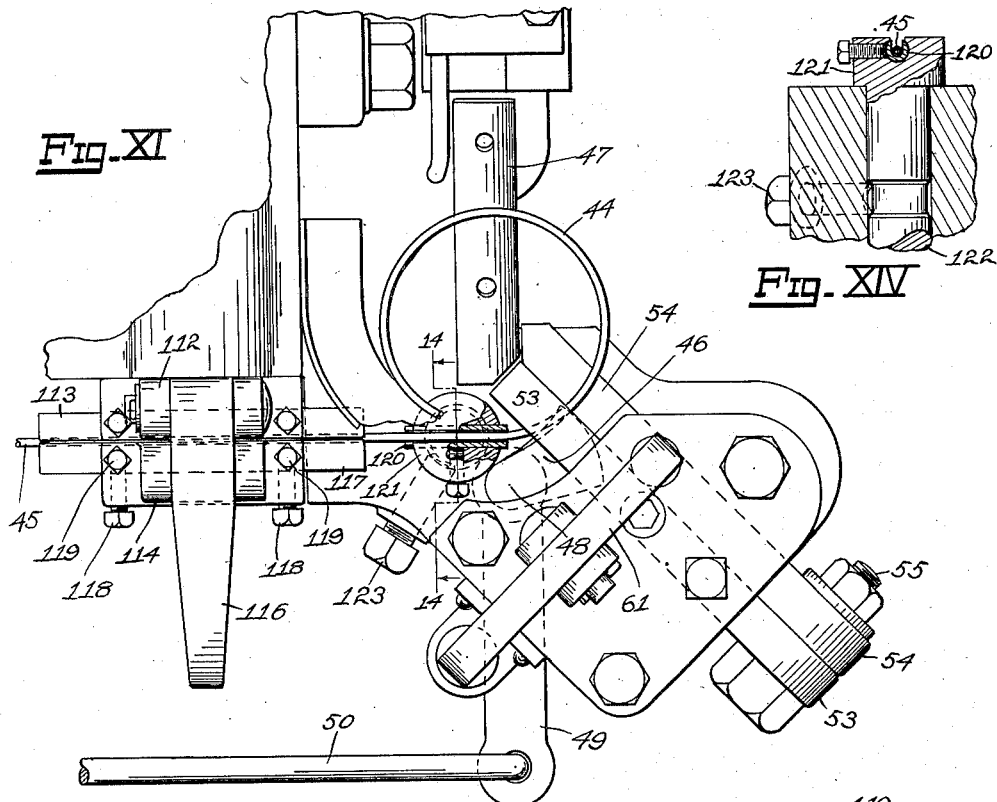
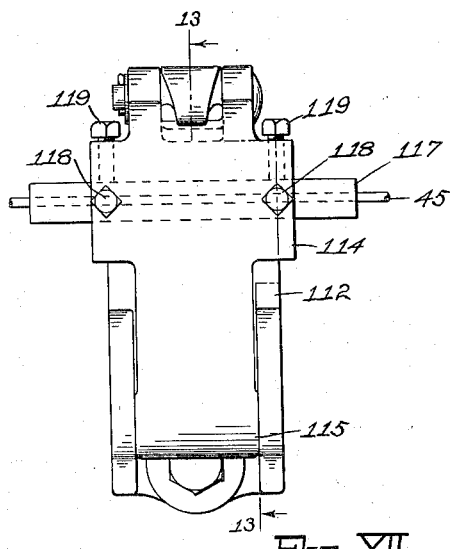
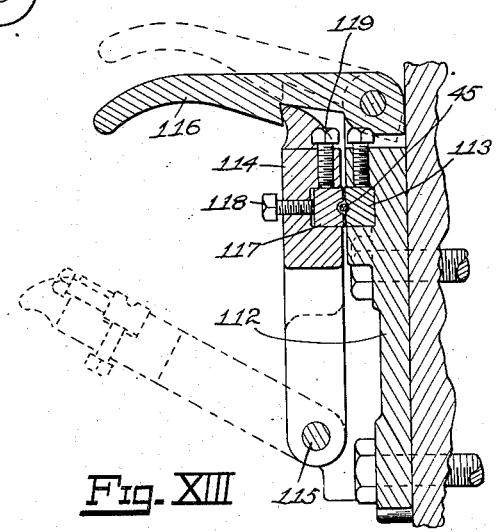
INVENTOR
Bert L. Van Orman
BY
Chappell & Earl
ATTORNEYS

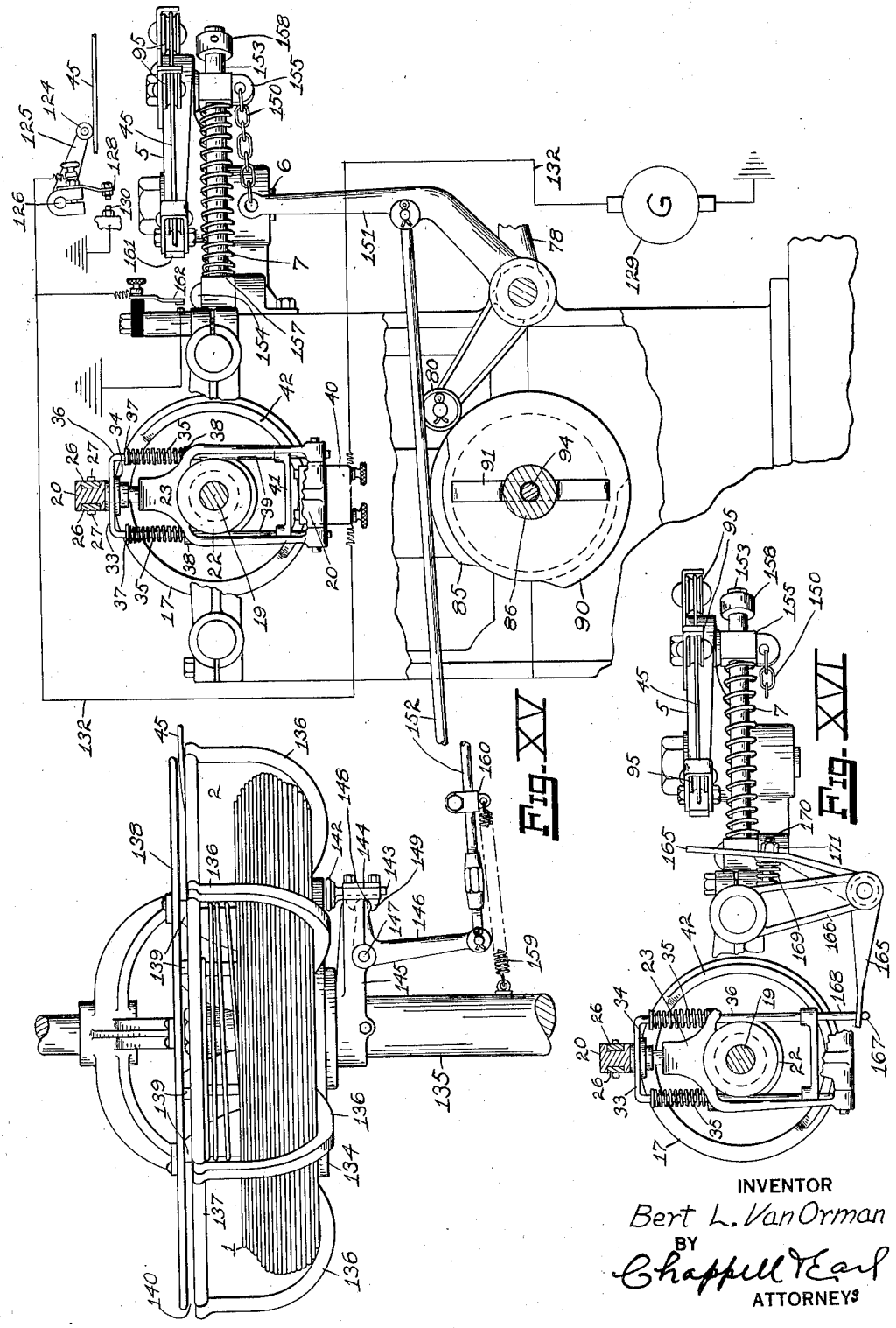

Patented Nov. 24, 1925.

1,562,997

UNITED STATES PATENT OFFICE.

BERT L. VAN ORMAN, OF DETROIT, MICHIGAN, ASSIGNOR TO L. A. YOUNG INDUSTRIES, INC., OF DETROIT, MICHIGAN.

WIRE-FEEDING MEANS.

Original application filed February 3, 1923, Serial No. 616,652. Divided and this application filed January 2, 1924. Serial No. 683,970.

*To all whom it may concern:*

Be it known that I, BERT L. VAN ORMAN, a citizen of the United States, residing at Detroit, county of Wayne, State of Michigan, have invented certain new and useful Improvements in Wire-Feeding Means, of which the following is a specification.

This invention relates to improvements in wire feeding means for coiling, bending or other wire forming means.

The embodiment of my invention illustrated, is designed for the manufacture of coiled springs, such as are used in vehicle and furniture seats, mattresses, bed springs and the like.

The construction and operation of the machine is fully described in my co-pending applications, Serial No. 474,899 filed June 2, 1921 and Serial No. 574,846 filed July 13, 1922, and is a division of my application Serial No. 616,652 filed February 3, 1923.

The main objects of this invention are:

First, to provide means for feeding wire intermittently at regular predetermined intervals to wire forming mechanisms.

Second, to provide means whereby the amount of wire supplied during each cycle of the operation may be regulated.

Third, to provide means for preventing back lash or retrograde movement of the wire during the idle periods of the forming mechanism, during which period the wire is released from the feeding means.

Fourth, to guide the wire between the supply bale and the forming devices.

Fifth, to provide a structure having these advantages which is comparatively simple, is very durable and the parts are accessible for adjustment.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this application, in which:

Fig. I, Sheet 1, is a fragmentary plan view of a spring coiling machine embodying my invention.

Fig. II, Sheet 2, is an enlarged fragmentary view partially in elevation and partially in section on a line corresponding to line 2—2 of Fig. I.

Fig. III, Sheet 3, is a detail view mainly in section on a line corresponding to line 3—3 of Fig. II, showing details of feeding rolls with driving and automatic controlling means therefor.

Fig. IV, Sheet 3, is a detail view mainly in section on a line corresponding to line 4—4 of Fig. III.

Fig. V, Sheet 1, is an enlarged fragmentary view partially in section on a line corresponding to line 5—5 of Fig. IV, showing details of the feed mechanism.

Fig. VI, Sheet 1, is a detail perspective view of the adjustable actuating cam in disassembled relation.

Fig. VII, Sheet 4, is an enlarged fragmentary view of a portion of Fig. II, illustrating details of wire feed controlling means.

Fig. VIII, Sheet 4, is a fragmentary view in section on a line corresponding to line 8—8 of Fig. VII, showing further details of the controlling means.

Fig. IX, Sheet 4, is an enlarged detail view mainly in section on a line corresponding to line 9—9 of Fig. VIII, illustrating details of a wire clutch.

Fig. X, Sheet 4, is an enlarged detail view in section on a line corresponding to line 10—10 of Fig. VIII, showing automatic circuit closing means actuated by the failure of wire supply.

Fig. XI, Sheet 5, is an enlarged fragmentary plan view of the wire coiling mechanism and wire guides.

Fig. XII, Sheet 5, is an enlarged detail view of one of the wire guides.

Fig. XIII, Sheet 5, is a detail section on a line corresponding to line 13—13 of Fig. XII.

Fig. XIV, Sheet 5, is a detail view of the final wire guide partially in section on a line corresponding to line 14—14 of Fig. XI.

Fig. XV, Sheet 6, is an enlarged fragmentary view partially diagrammatic, partially in elevation and partially in section on a line corresponding to line 15—15 of Fig. I, showing the assembled relation of parts of wire feed governing mechanism.

Fig. XVI, Sheet 6, is a modification of parts shown in Fig. XV, illustrating mechanical means of automatically stopping the machine.

In the drawing similar reference characters refer to similar parts throughout the several views and the sectional views are taken looking in the direction indicated by the little arrows at the ends of the sectional lines.

Referring to the drawing, the operation of the machine which as stated, is adapted for the making of coiled springs for use in upholstery, mattresses and the like, is in general as follows:—

The wire is drawn from a stock bale 1, carried by a reel 2 (see Fig. I) through suitable guides 3 and 4 to a tension arm 5 which is pivoted at 6 and yieldingly supported by means of the coil spring 7. From the tension arm, the wire passes to the feed rollers 8 by which it is driven to the coiling mechanism designated generally in Fig. I by the numeral 9. After coiling, the spring is carried to the first knotter designated generally by the numeral 10 (see Fig. I) by means of a reciprocating arm 11. This first knotter forms the bottom knot of the spring which is then transferred to another knotting device which knots the top end of the spring. Since this final knotter and the means of transferring the spring thereto are not directly associated with my present improvements, I have not illustrated such parts of the machine in my present drawing. Operation of the knotter and transferring means is shown and described in my applications for Letters Patent hereinbefore referred to. I also deem it unnecessary to illustrate and describe details of the coiling mechanism 9 herein, further than it has directly to do with my present invention.

Power from any suitable source is received by a pulley 17 which is arranged to be operatively connected to a driven gear 18 (see Fig. III) by suitable transmission enclosed within the pulley. Since the construction and operation of this power transmitting means is described in detail in my co-pending application, Serial No. 595,995 filed October 21, 1922, I deem it sufficient in this case to give a general description and to illustrate and describe means of controlling the change speed mechanism.

A driven shaft 19 which carries the driven gear 18 (see Fig. III) extends through the mechanism and a supporting bearing 20, and carries a hand wheel 21 on its outer end.

By means of the wheel 21, the machine may be slowly turned over by hand in setting up and making adjustments. The driven shaft 19 forms a support for the gears and clutches which constitute the change speed transmission. A cone 22 reciprocatably mounted on the shaft 19 may be moved by a yoke 23 into or out of engagement with rollers 24 carried by levers 25 which are so arranged as to be capable of causing frictional engagement between the driving and the driven parts. When the yoke 23 is moved inwardly the levers are expanded thereby frictionally locking all of the transmission parts together as a unit and causing the driven gear 18 to rotate at the same speed of the driving pulley 17. Movement of the cone 22 outwardly a suitable distance releases the frictional engagement of the parts and allows the driving members to revolve idly while the driven shaft 19 and gear 18 remain stationary. Movement of the yoke 23 and cone 22 is controlled by a slide bar 26 reciprocatably mounted above the transmission and operatively connected to the yoke 23 by a pin 27 engaging openings in the sides of the bar 26. The bar 26 is manually actuated by a hand lever 28 pivoted at 29 and connected with the bar 26 by a link 30. After the yoke 23 has been moved far enough to neutralize the transmission, continued outward movement of the bar 26 contracts brake shoes 31 upon a suitable drum 32 thereby holding certain gears stationary and causing the driven gear 18 to be rotated at half the speed of the pulley 17.

In Figs. I, III and XV are illustrated means of automatically throwing out the yoke 23 to neutralize the transmission and stop the machine. A roller 34, reciprocatably mounted upon the upwardly extending portion of the yoke 23, is normally held to its upward limit by springs 35 which are carried by a yoke 36 and are in compression between the collars 37 and bosses 38 on the shifting yoke 23. The yoke 36 has a horizontal upper portion 33 engaging a groove in the roller 34, and downwardly extending arms 39 reciprocatable in guides in the cone shifting yoke 23. An electro-magnet 40 is mounted on a stationary part of the machine in operative relation to an armature 41 carried by the yoke 36. When the electromagnet is energized by passage of an electrical current through it, the yoke 36 is caused to pull the roller 34 downward and into range of a face cam 42 carried by the pulley 17. If this action occurs while the yoke 23 is in a position to hold the transmission in high speed, the yoke 23 is thrown into neutral position by the cam 42 within the first revolution of the pulley, thereby immediately disconnecting power from the machine. This automatic stopping device is a valuable safety measure which may be brought into action to stop the machine whenever certain abnormal conditions arise that might cause injury to the machine.

The driven gear 18 is operatively connected to a train of gears, indicated generally by the numeral 43, which cause motion of the various parts of the machine in correctly timed relation to operate the machine properly.

The coiling of wire into a spring of substantially the form shown at 44 in Fig. II is accomplished by projecting the wire 45 against a coiler block 46 (see Fig. XI) which co-operates with a pitch bar 47. The coiler block 46 is oscillated about a center 48 by a rock arm 49 which is actuated through a connecting link 50 by a cam lever 51 and cam 52 (see Fig. II). In forming the coil, the wire 45 under-runs a fixed bar 53 and over-runs a cutter bar 54, which is pivoted at 55 and adapted to be swung upwardly across the shearing face of the bar 53 by tappets 56 and 57 which are projected upward by a lever 58 pivoted at 59 and actuated by a cam 60 (see Fig. II). Return movement of the cutter bar 54 is effected by pressure from a rock lever 61 actuated by a spring 62. This cutting device acts to sever each formed spring from the unformed stock.

After each spring is formed, it is desirable that the movement of the wire be stopped for a period of time sufficient to allow the coiled spring to be severed and removed from the coiling mechanism. This requires an intermittent wire feeding action which is accomplished by the following means: Wire is pulled from the supply bale 2 and forced through guides 63 and 64 (see Figs. II and III) to the coiling mechanism by the feed rollers 8 consisting of lower rollers 8$^a$ and upper rollers 8$^b$. The rollers all revolve at the same speed, the wire being forced along by frictional engagement with suitable grooves 65 formed in the peripheries of the rollers. The lower rollers 8$^a$ are journaled in a stationary bearing member 66 mounted in the main frame of the machine and are adapted to receive motion from the driven gear 18 through suitable gears 67, 68 and 69 (see Figs. III and IV). The upper rollers 8$^b$ are carried by a bearing member 70 which is pivoted to the main frame by pins 71. By rocking the bearing member 70 on the pivots 71, the upper rollers may be lifted out of engagement with the lower rollers whenever it is desired to stop the feeding of wire to the coiler. The upper rollers are driven through gears 72 which are in mesh with the gears 69 of the lower rollers. The amount of lift required to release the feed on the wire is so slight that the gears 72 are not lifted out of proper driving relation with the gears 69 far enough to in any way affect the rotation of the rollers 8$^b$ which are running idle during this interval. The bearings are so spaced as to bring the gears into correct mesh while the feed rollers are at work.

The upper rollers 8$^b$ are held in operative relation with the lower rollers during their working period by a clamping lever 73 pivoted to the main frame at 74 and exerting pressure upon the bearing member 70 through an adjusting screw 75 which is locked in set position by a hand wheel or lock nut 76. A removable bearing surface, as for instance, the hardened pin 75', is preferably interposed between the adjusting screw and the bearing member 70. The clamping lever 73 is connected by an adjustable link 77 to a cam lever 78 which carries rollers 79 and 80, engaging a cam indicated in general by the numeral 81 (see Figs. IV, V and VI). A spring 82 which is held in position by a cylindrical keeper 83 supported by a bar 84, is in compression between the lower bearing member 66 and the upper bearing member 70. Whenever pressure from the clamping lever is released, expansion of the spring 82 lifts the upper feed rollers out of operative engagement with the lower rollers. This arrangement enables the cam 81 to control the amount of wire used in the coil and to time the movement of wire in correct relation to the action of the coiler parts.

In order to avoid the necessity of providing a separate cam for each type of spring manufactured by the machine, I have designed the feed control cam 81 in such a way that the length of dwell may be varied to meet any feeding requirements. As embodied herein, this cam 81 consists of two spaced cam members 85 and 90 (see Figs. III, IV, V and VI) each cam member operatively engaging one of the rollers carried by the lever 78. The cam member 85 is fixed to a drive shaft 86 as by the pin 87, and has a spacer portion 88 with a shoulder 89 formed to receive the other ring-like cam member 90. The cam member 90 is held in frictional engagement with its companion cam member 85 by a clamping block 91 resting in a slot 92 in the shaft 86, the clamping block being pressed against the cam by a set screw 93 and interposed rod 94 lying in an axial bore of the shaft 86. By loosening the set screw the cam member 90 may be turned to any position relative to the fixed cam member 85. Since the cam lever 78 is held in actuated position whenever either of its rollers 79 or 80 is in contact with a working portion of the corresponding cam member, the feed rollers 8 are held in operative engagement from the time that the lever 78 is actuated by one cam member until it is released by the other cam member. For instance, the feeding of wire to the coiler begins when the cam member 85 first engages roller 79 and stops when the member 90 goes out of engagement with roller 80. By shifting the member 90 in relation to the member 85, the cam 81 may be set to meet the feeding requirements of any type of spring that the coiler can form. It is desirable to mark the spacer 88 with a graduated scale (see Figs. V and VI) and the adjacent surface of the member 90 with a line to serve as a guide when making adjustment.

The action of the feed rollers 8 draws the wire from the reel through the guides 3 and 4, over rollers 95 carried by the tension arm 5 and around a guide roller 96 to an arresting device 97 supported by the guide member 98. The arresting device (see Figs. II, VII, VIII and IX) prevents backlash or retrograde movement of the wire 45 during the interval of time that the wire is released by the feed rollers 8. The device consists of a bracket 97' supporting suitable guide members 99 through which the wire passes. A bell crank clutch lever 100 pivoted at 101 in the bracket 97' is so disposed as to be forced by a compression spring 102 against the wire at such an angle that the wire is firmly gripped or clutched between the lower end of the clutch lever and the upper end of a supporting block 103 which is vertically adjustable by an adjusting screw 104 and lock nut 105. Whenever the clamping lever 73 is pulled downward to bring the feed rollers 8 into action, a tappet 106 adjustably mounted upon the lever and having a beveled edge 107, engages the upper end of the bell crank 100 and forces the lower end against the pressure of the spring 102 thereby releasing the hold on the wire 45 (see dotted outline in Fig. IX). Since the gripping action of this arresting device is controlled by movement of the feed actuating lever 73, the wire is free to pass through the guides whenever the feed rollers 8 are in action, but is held firmly by the clutch whenever released by the feed rollers. The clutch lever 100 is shown as being constructed with duplicate end portions in order that it may be inverted to present a new surface to the wire when one end has become worn.

The wire is supported and guided between the pairs of feed rollers by a guide consisting of bushing 109 carried by a suitable bracket 110. Upon leaving the last pair of feed rollers, the wire passes through the guide member 63 (see Figs. XII and XIII) which is especially designed for accessibility and consists of a stationary block 112, carrying a hardened insert 113, and a movable section 114 which is pivoted at 115 and clamped into closed position by a suitable lever 116. The pivoted section 114 also holds a hardened insert 117, the position of which is adjustable by means of adjusting screws 118 and set screws 119. By swinging the movable section 114 to open position (see dotted outline in Fig. XIII) ready access may be had for inspection, for initially entering the wire and for removing the short piece of wire left after exhaustion of the supply.

The final guide 64 (see Fig. XIV) consists of a bushing 120 adjustably secured in the head 121 of a stud 122 which is rotatably adjustable in the main frame, being held in position by a set screw 123. Accurate adjustment of this guide is essential as the guide bears the reaction from the pressure of the coiler block and co-operates with the latter when coiling springs. As an adjunct to the accessible feature of the guide member 63, the bushing 120 is preferably left open on top so that when the supply of wire becomes exhausted the guide member 63 may be opened and the wire readily removed from both final guides. Since the guide member 63 supports the wire to a point near the guide 64 and upon leaving the latter, the wire passes underneath the upper cutting bar 53, there is no tendency for the wire to get out through the top of the bushing 120 during the coiling process.

When the supply of wire becomes exhausted, the machine is stopped by the following means:—

A roller 124 is carried by a rock arm 125 secured to a shaft 126 journaled in bearings 127 on the main frame. An electrical contact member 128 also secured to the shaft 126 in insulated relation thereto (see Fig. X) is in circuit with a generator 129 or other source of current and the electromagnet 40 of the automatic stopping mechanism (see Fig. XV). The roller 124 rests upon the wire 45 at a point near the feed rollers 8 so that the wire normally holds up the rock arm 125 and likewise holds the contact 128 away from the ground contact 130 (see Figs. II, VII, VIII and X). Exhaustion of the wire allows the roller 124 to fall and the member 128 to ground on the contact 130 thereby closing the electrical circuit 132 and causing the electro-magnet to be energized and the machine to be stopped.

The reel 2 which carries the stock bale 1 for delivery of the wire to the coiler or other forming means consists of a circular base plate 134 (see Fig. XV) which is rotatable on a post 135 and to which is attached a series of radially disposed supporting arms 136. These supporting arms are so designed as to provide a concave surface in which a bale or coil of wire may rest and center itself in relation to the axis of rotation. The outer ends of the arms 136 are interconnected by a ring 137 which is round in section or at least has a rounded inner surface over which wire may be led, without undue resistance. A removable cover plate 138 is adapted to rest upon lugs 139 on the inner portions of the arm 136, the lugs holding the cover at the correct height to leave an annular space 140 between the outer margin of the cover plate and the ring 137. This annular space permits ready withdrawal of wire from the bale 1 while the cover 138 prevents any loose coils from getting out of the reel. A means of locking the cover 138 in position on the reel 2 is fully disclosed in my said co-pending application Serial No. 616,652. Since such details form no part of my present invention, they are not shown herewith.

When wire is drawn from a bale of wire supported by the reel, the bale and reel assembly revolve on the post 135 to allow the wire to uncoil. As the reel revolves the inertia tends to rotate it at a constant and uniform rate of motion while the operation of the coiling mechanism requires intermittent feeding of wire as I have described. There is a tendency for the reel to continue to revolve during the idle intervals thereby causing the wire to be delivered in excess of the demands of the coiler. To compensate for this, I have provided the following means of governing the rotation of the reel:—

The reel is provided with a brake shoe 142, faced with suitable frictional material, which may be forced against the lower surface of the base plate 134 by reciprocation of a brake spindle 143 in an appropriate guide in a bracket 144 which is mounted on the outer end of a supporting arm 145. The brake spindle 143 is actuated by a bell crank lever 146 which is pivoted at 147 to the arm 145 and has a rounded end 148 rocking in a recess formed by suitably fashioned lugs 149 on the spindle 143. The bell crank 146 is actuated by the swinging movement of the tension arm 5, the motion being translated by any suitable means, as for example, the flexible connection 150, the rock arm 151 and an adjustable connecting rod 152. The tension of the wire tends to swing the arm 5 inwardly against the opposing action of the spring 7, which is carried by a rod 153 pivoted to the main frame at 154 and slidably supported by a block 155, pivoted on a vertical axis 156 on the tension arm 5. The spring 7 is in compression between a shoulder 157 on the rod 153 and the block 155 and urges the tension arm outward, this movement being limited by a collar 158 on the spring rod 153. Whenever this reel is supplying wire in excess of the demand, as for instance, during an idle period in the operation of the coiling mechanism, the tension in the wire is reduced thereby allowing the spring 7 to swing the tension arm 5 outwardly. Outward movement of the tension arm, through the connections shown, actuates the bell crank 146 and engages the brake 142 with the lower surface of the reel base plate 134 thereby retarding the motion of the reel and establishing the desired tension in the wire. Excessive braking action increases the tension in the wire, pulls the tension arm inwardly and releases the brake 142. By this means equilibrium is maintained between the tension spring 7 and the tension of the wire 45 which is drawn around the tension arm 5. Whenever pull from the tension arm is released, the bell crank 146 is returned to inoperative position by any suitable means as the spring 159 in tension between the post 135 and a lug 160 carried by the connecting rod 152.

If the wire should be placed under abnormal or undue stress, as for instance when wire becomes tangled in the reel, or if for any other reason the wire fails to feed from the bale, the tension arm 5 is pulled inwardly far enough to cause the end 161 of the arm to press against an electrical contact member 162 (see Fig. I) thereby grounding or closing the electrical circuit 132 in which the electro-magnet 40 is included. The energized electro-magnet actuates the automatic control mechanism previously described, to stop the machine. By means of the automatic stopping mechanism and the reel retarding device, movement of wire under correct tension is assured whenever the machine is in operation.

In the modification illustrated in Fig. XVI, I have shown mechanical means by which the tension arm 5 may stop the machine. The mechanism consists of a bell crank 165 pivoted on a bracket 166 with one end in range of the end 161 of the tension arm 5, the other end of the bell crank being adapted to engage a laterally projecting pin 167 on a downwardly extending portion 168 of the yoke 36. The bell crank 165 is normally held in inoperative position by a spring 169 in compression between the bracket 166 and the upper arm of the bell crank, the spring being supported by a keeper 170 which extends through the crank arm and carries a stop nut 171 to limit the movement of the bell crank. As the bell crank is rocked against the pressure of the spring 169 by impact from the tension arm 5, the yoke 36 is reciprocated downwardly thereby causing the machine to be stopped by means of the mechanism previously described.

I have not attempted to illustrate or describe certain modifications in structure which I contemplate as I believe that the disclosure made will enable those skilled in the art to which my invention relates to embody or adapt the same as may be desired.

Having thus described my invention, what I claim as new and desire to secure by Letters Patent is:

1. The combination of a wire feed means comprising coacting feed rollers, means for applying intermittent feeding pressure to said rollers, means for preventing retracting of the wire when released by the feed rollers operatively associated with said feed control means, a stock reel, a tension arm over which the wire is guided, driving means for said feed rollers including a clutch, a control means for said clutch including said tension arm whereby an excessive stress thereon actuates said clutch to disconnect said feed roller driving means, a brake for said reel, and operating connections from said tension arm to said brake.

2. The combination of a wire feed means comprising coacting feed rollers, means for applying intermittent feeding pressure to said rollers, means for preventing retracting of the wire when released by the feed rollers operatively associated with said feed means, a stock reel, a tension arm over which the wire is guided, driving means for said feed rollers including a clutch, a control means for said clutch including said tension arm whereby an excessive stress thereon actuates said clutch to disconnect said feed roller driving means.

3. The combination of a wire feed means comprising coacting feed rollers, means for applying intermittent feeding pressure to said rollers, a stock reel, a tension arm over which the wire is guided, driving means for said feed rollers including a clutch, a control means for said clutch including said tension arm whereby an excessive stress thereon actuates said clutch to disconnect said feed roller driving means, a brake for said reel, and operating connections from said tension arm to said brake.

4. The combination of an intermittent wire feed means, a stock reel, a tension member for the wire, driving means for said wire feed means including a clutch, a control means for said clutch, including said tension member whereby an excessive stress on the wire actuates said clutch to disconnect said feed means, a brake for said reel, and operating connections for said reel to said tension member.

5. The combination of wire feed rolls, means for applying feeding pressure thereto comprising a pivoted arm, an actuating cam, a lever actuated by said cam, a link connecting said lever to said arm, a wire clutch means comprising a pivoted clutch member, and a tappet mounted on said arm to engage said lever when said arm is actuated to apply pressure to the feed roll whereby said wire clutch means is released, said tappet being adjustably mounted on said arm.

6. The combination of wire feed rolls, means for applying feeding pressure thereto comprising a pivoted arm, an actuating cam, a lever actuated by said cam, a link connecting said lever to said arm, a wire clutch means comprising a pivoted clutch member, and a tappet mounted on said arm to engage said lever when said arm is actuated to apply pressure to the feed roll whereby said wire clutch means is released.

7. The combination of wire feed rolls, means for applying feeding pressure thereto comprising a pivoted arm, a wire clutch means, and a clutch releasing tappet mounted on said arm to release said clutch when said arm is actuated to apply pressure to the feed roll, said tappet being adjustably mounted on said arm.

8. In a wire coiling machine, the combination of a wire guide member open at the top to facilitate the introduction and removal of the wire therefrom, feed rolls, a wire guide member disposed between said feed rolls and said wire guide member and comprising a relatively fixed support member and a coacting pivoted support member, a latch for holding said pivoted support member in its closed position, and coacting guide blocks mounted on said support members and having opposed grooved faces, one of said blocks being adjustably mounted in its support.

9. In a wire coiling machine, the combination of a wire guide member open at the top to facilitate the introduction and removal of the wire therefrom, feed rolls, a wire guide member disposed between said feed rolls and said wire guide member and comprising a relatively fixed support member and a coacting pivoted support member, a latch for holding said pivoted support member in its closed position, and coacting guide blocks mounted on said support members and having opposed grooved faces.

10. In a wire coiling machine, the combination of a wire guide member open at the top to facilitate the introduction and removal of the wire therefrom, feed rolls, a wire guide member disposed between said feed rolls and said wire guide member and comprising a relatively fixed member and a coacting pivoted member, and means for holding said pivoted member in its closed position.

11. In a wire feeding means, the combination with feed means adapted to engage the wire with intermittent feeding engagement, of a clutch means for preventing rebound of the wire when released by the feed means comprising a clutch block, means for adjustably supporting said block, a pivoted clutch lever operatively associated with said clutch block, a spring urging said clutch lever to engaging position, and means for actuating said lever to release the wire synchronized with the feeding of the wire.

12. The combination of wire feed rolls, means for applying feeding pressure thereto comprising a pivoted arm, a pivoted wire clutch member, and a clutch releasing tappet mounted on said arm to engage said clutch member to release the clutch when said arm is actuated to apply pressure to the feed rolls.

13. The combination of wire feed rolls, means for applying feeding pressure thereto comprising a pivoted arm, a pivoted wire clutch member mounted in advance of said feed rolls so that its wire clutching movement is away from the rolls and its releasing movement toward the same, and a clutch releasing tappet actuated by said arm to release the clutch when the arm is actuated to apply pressure to the feed roll.

In witness whereof, I have hereunto set my hand.

BERT L. VAN ORMAN.